United States Patent [19]

Pieters et al.

[11] 4,123,389

[45] Oct. 31, 1978

[54] PYROGENIC SILICA OR TITANIA OR ALPHA-ALUMINA CUPROUS CHLORIDE CATALYST OF HYDROGEN CHLORIDE/OXYGEN REACTION

[75] Inventors: Wim J. M. Pieters, Morristown; Emery J. Carlson, Chatham; William E. Gates, Andover; William C. Conner, Jr., Succasunna, all of N.J.

[73] Assignee: Allied Chemical Corporation, Morristown, N.J.

[21] Appl. No.: 765,161

[22] Filed: Feb. 2, 1977

[51] Int. Cl.$^2$ .................. B01J 27/06; C07C 17/00; B01J 27/06

[52] U.S. Cl. .................. 252/441; 260/658 R; 252/442

[58] Field of Search .................. 252/441, 442

[56] References Cited

U.S. PATENT DOCUMENTS

| | | | |
|---|---|---|---|
| 2,734,874 | 2/1956 | Drake et al. | 252/461 |
| 3,210,158 | 10/1965 | Engel et al. | 252/441 X |
| 3,210,431 | 10/1965 | Engel | 252/441 X |
| 3,235,508 | 2/1966 | Mills | 252/454 X |
| 3,240,827 | 3/1966 | Lainé et al. | 252/441 X |
| 3,260,678 | 7/1966 | Engel et al. | 252/441 |
| 3,468,968 | 9/1969 | Baker et al. | 252/442 |
| 3,527,819 | 9/1970 | Berkowitz et al. | 252/441 X |
| 3,634,330 | 1/1972 | Michel et al. | 252/441 |
| 3,657,367 | 4/1972 | Blake et al. | 252/442 X |
| 3,709,950 | 1/1973 | Baker et al. | 252/442 X |
| 3,717,670 | 2/1973 | Schultz | 252/447 X |

*Primary Examiner*—Delbert E. Gantz
*Assistant Examiner*—William G. Wright
*Attorney, Agent, or Firm*—Robert A. Harman

[57] ABSTRACT

Catalyst of cuprous chloride, as a first layer, on a carrier of particles of pyrogenic anhydrous silica or titania, or alpha-alumina produced from pyrogenic gamma-alumina, having as a second layer an alkali metal chloride especially KCl, and preferably also a rare earth metal chloride; especially LaCl$_3$; formed by impregnation using non-aqueous solvents, especially CuCl in acetonitrile followed by KCl/LaCl$_3$ in formic acid. The catalyst is effective at desirable reaction rates at temperatures well below 400° C., such as 200°–300° C. and even below 200° C., under certain conditions, for oxyhydrochlorination of organic materials such as methane; and is also effective for production of chlorine by the Deacon process at relatively low temperatures. Problems due to catalyst volatility and melting are substantially mitigated.

7 Claims, No Drawings

PYROGENIC SILICA OR TITANIA OR ALPHA-ALUMINA CUPROUS CHLORIDE CATALYST OF HYDROGEN CHLORIDE/OXYGEN REACTION

BACKGROUND OF THE INVENTION

This invention relates to an improved copper chloride/alkali metal chloride catalyst on silica or titania carrier, for reaction between hydrogen chloride and elemental oxygen generating chlorine and/or chlorinating an organic material containing hydrogen replaceable by chlorine.

Such catalysts are known in general in the prior art, for example, in U.S. Pat. No. 3,210,158 of Oct. 5, 1965 to Engel et al. In that patent a silica gel preferably having average pore diameter of at least 60 Angstroms, e.g. 140 Angstroms in certain examples, and having surface area of at least 200 square meters per gram is impregnated with a solution of the chlorides of copper, one or more rare earth metals and one or more alkali metals. Conventionally, such catalysts are formed by use of aqueous solutions. The impregnated carrier was dried and heated for 3 hours in an air stream to 250° C.

The catalyst was used for conversion of hydrogen chloride into chlorine at space velocities in the examples of 40 liters of gaseous HCl or 80 liters of gaseous HCl per kilogram of catalyst per hour. These space velocities calculate to residence times of about 50 seconds and about 20 seconds, respectively. The proportions of metal compounds and the temperatures employed are such as to assure that the mixture of metal compounds is entirely or partly present in the molten state. The temperatures in the examples are 300° C., 350° C. and 400° C.

U.S. Pat. No. 3,657,367 of Apr. 18, 1972 to R. J. Blake et al. is representative of prior art disclosures showing chlorination of organic materials in the vapor phase by action of hydrogen chloride and an oxygen-containing gas (i.e. the process known as oxyhydrochlorination, or "OHC"). This patent points out that copper halide catalysts are volatile at the required reaction temperature, resulting in loss of activity over an extended period of time and a tendency of the catalyst to cake during its active life. The patent discloses a catalyst of cupric chloride, potassium chloride or sodium chloride, and a mixture of didymium and lanthanum chlorides, whereby the fluidized catalyst does not tend to cake during its active life at the reaction temperatures which are between about 300° and about 600° C., preferably between about 350° and about 450° C. The preferred residence time is about 1 to about 20 seconds, especially about 2 to 10 seconds. The supports or carriers used in this patent have surface area not over 90 square meters per gram, preferably about 1 to about 30 square meters per gram; they include silica gel but preferably are alpha-alumina or silica-alumina.

A catalyst formed from finely divided pyrogenic oxide such as non-porous pyrogenic silica particles, impregnated with an aqueous solution of a metal compound such as molybdenum, chromium, tungsten, cobalt, vanadium, titanium, platinum, nickel and the like, has been disclosed in U.S. Pat. No. 3,235,508 of Feb. 15, 1966 to K. L. Mills. The catalyst is employed for hydrocarbon cracking and for olefin polymerization.

SUMMARY OF THE INVENTION

The present invention is directed to an improved copper chloride/alkali metal chloride catalyst on silica, titania or alpha-alumina carrier or support, for production of chlorine or organic chlorination products, involving reaction between hydrogen chloride and elemental oxygen. The subject catalyst consists essentially of a carrier of open structure, especially such carrier of pyrogenic origin, on which the active ingredients are deposited. By "open structure" is meant that the carrier is formed from colloidal size particles adhering to one another in chains, loops and the like whereby the carrier has relatively low bulk density, typically about 0.03–0.05 gm./ml. for silica carriers. The carrier is composed of adhering silica, titania or alpha-alumina particles, which particles are non-porous and have diameters in the range of about 50 to 1000 Angstroms. The carrier has surface area of at least about 50 square meter per gram, preferably between about 100 and about 400 square meters per gram by the BET method using nitrogen gas.

The finished catalyst consists of granules, and has voids within the granules such that at least 20% of the voids have radii greater than 200 Å as measured by nitrogen sorption isotherms. The surface of said granules is occupied by the active catalyst, viz. a first layer or deposit of copper chloride and a second layer composed of at least one alkali metal chloride and permissibly also composed of at least one rare earth metal chloride. By "layer" we mean to include patchy, broken and irregular surface deposits which may interpenetrate each other here and there, or may form substantially continuous coatings.

DESCRIPTION OF THE PREFERRED EMBODIMENTS

In the catalyst of this invention, the non-porous particles forming the carrier are preferably particles of pyrogenic silica (also known as "fumed" silica). Preferably the first layer of active catalyst, i.e. copper chloride, is in larger molecular proportion than the second layer. In addition to alkali metal chloride, the second layer of active catalyst also includes, in preferred compositions, a rare earth metal chloride in a molecular proportion less than that of the alkali metal chloride therein. Preferably the alkali metal chloride is potassium chloride.

Preferred catalysts are composed essentially of silica about 30–85% by weight of the total catalyst, rare earth metal chloride at least about 5% by weight of the total catalyst, and potassium chloride at least equal in weight to the rare earth metal chloride; with copper chloride, essentially in cuprous form, essentially the balance of such catalyst and amounting to at least about 10% by weight of the total catalyst. Preferably the rare earth metal chloride comprises lanthanum chloride.

The subject catalyst carrier is anhydrous in the sense that it shows an ignition loss, as prepared, of not over 5% at 1000° C. During preparation of the catalyst, overexposure to moisture should be avoided, since otherwise collapse of the carrier structure may ensue, as a result of hydration of the carrier. Small amounts of moisture in the finished catalyst, such as 5 to 10% by weight of the catalyst, appear to be harmless, however, according to our tests.

Accordingly, the impregnation with the active catalyst ingredients is advisedly accomplished using essentially anhydrous solvents. The cuprous chloride ingredient can be introduced onto the carrier using a volatile organic solvent such as acetonitrile, which is then evaporated to leave a layer of cuprous chloride on the carrier particles. Then the potassium chloride ingredient can be introduced as a solution and the lanthanum chloride as a solution or colloidal dispersion, in a volatile organic solvent such as high strength formic acid. Formic acid is particularly suitable because it does not dissolve the earlier formed deposit of cuprous chloride. The concentration of the active ingredients (copper chloride, potassium chloride, and lanthanum chloride) is preferably adjusted with reference to the surface area of the pyrogenic silica particles so that theoretically on the average, after drying, between 1 and about 10 monolayers, i.e. coatings one molecule thick, of the active ingredients will be formed upon the silica carrier; preferably about 5 monolayers. The cuprous chloride is preferably applied first, we have found; we believe this indicates coordination of some sort occurs, in the active form of the catalyst, between atoms of the anhydrous silica surface and atoms of cuprous chloride.

After each step of impregnating with a solution the composition is dried. The resulting dried, freshly prepared catalyst is frequently not active below 350° C. for oxyhydrochlorination (OHC) reactions such as that of methane. The catalyst becomes active at lower temperatures, by exposure to the stated reactants at a temperature such as 350° C. or above. Once reaction begins, the temperature can be lowered in OHC reactions to well below 350° C., and even well below 300° C. for certain proportions of hydrocarbon:HCl:oxygen; while still maintaining a desirable rate of reaction as indicated by a residence time such as 1.5 to 3 seconds at conversion of hydrocarbon (e.g. methane) in the OHC reaction amounting to at least about 50% and up to 100%.

Hydrogen gas and HCl gas are effective catalyst activators at about 280°-320° C. for OHC reactions of methane. A volume of such gas equal to the volume of the catalyst bed is sufficient.

The temperature level at which our catalyst is active for OHC reactions, we have found, depends on the composition of the reacting gases. When, for example, the inlet composition is about the stoichiometric in $CH_4$ and HCl, and oxygen is at least stoichiometric, for production of $CHCl_3$ and/or $CCl_4$ from methane, HCl, and oxygen — our catalysts (once activated) are active down to temperatures as low as 175°-190° C.; whereas as compositions containing higher proportions and lower proportions of methane are fed to the catalyst bed, progressively higher temperatures must be used, up to about 350° C. Lowest operating temperatures can be reached when the oxygen is present in the inlet reaction mixture in excess over the above cited stoichiometric proportion.

For any reaction mixture of e.g. oxygen, methane and hydrogen chloride there is a minimum usable operating temperature, or "extinction" temperature, below which the hydrocarbon conversion abruptly drops to nil from generally above 60% at about 1.5-3 seconds residence time. The catalyst is then inactive, but may be reactivated by passing the reactants in contact therewith at temperature of 350° C. or above.

Cupric chloride deposited on the carrier from a solvent such as methanol functions under our conditions as a source of cuprous chloride. The cupric chloride and the solvent should be substantially anhydrous, to maintain the anhydrous condition of the silica carrier; and the solvent should be volatile to allow complete removal by moderate heating, not above 300° C. When cupric chloride is the starting material, we have found that on the pyrogenic form of silica, used as carrier in our catalyst, the cupric state of copper is reduced under our oxyhydrochlorination conditions at least in large part to the cuprous state. The copper chloride ingredient of this catalyst accordingly is essentially cuprous chloride.

Advantages of our catalysts are that they are operative at temperatures well below 400° C., and indeed below 300° C. At 300° C. and below, the active ingredients do not melt, and are quite stable against volatilization, so that the catalyst remains active over long periods and is free from caking. The corrosiveness, at the low temperatures (200°-350° C.) which can be used under circumstances pointed out above, toward "Inconel" 600 chromium-nickel alloy is of the order of only 3 mils per year. The catalyst granules are strong enough to be practical for use in a fluid bed operation. At relatively high HCl proportions in the inlet reaction mixture, significant amounts of free chlorine together with oxyhydrochlorination products are obtained by using catalysts of this invention.

The examples which follow illustrate our invention and set forth the best mode contemplated by us for carrying out the invention but are not to be interpreted in a limiting sense.

Example I illustrates the presently preferred method of preparation of our catalyst; tabulated Runs 1–18 illustrate results obtained by its use in the oxyhydrochlorination of methane to chlorinated products. An unusual observation is that in this reaction a certain amount of free chlorine can be obtained by use of our catalyst, e.g. under the conditions shown in Runs 7 and 16 of Table I.

Example II illustrates an alternative procedure starting with cupric chloride. Table II shows the results obtained.

Example III shows use of titania as carrier; Table III shows results. Similarly, Example IV and Table IV relate to use of alpha-alumina as carrier.

Parts are by weight unless otherwise stated.

EXAMPLE I. CATALYST PREPARATION FROM CuCl

Constituents By Weight 41.66% CuCl
11.46% KCl
9.38% $LaCl_3$
37.5% Anhydrous Pyrogenic $SiO_2$

Preparation of Saturated Solution of CuCl in Acetonitrile

Stir 100 parts of solid CuCl and 235 parts of liquid acetonitrile solvent at room temperature (20° C.) for 45 minutes in a closed flask. Allow to settle and separate the supernatant saturated solution.

Set aside 100 volume parts (85–86 weight parts) of the saturated solution for the next step — to be used freshly. (The solution contains 10.0 parts of CuCl.)

Impregnation of Silica with CuCl

Weigh out 9 parts of pyrogenic silica particles (such as that sold by Cabot Corp. as "CAB-O-SIL" Grade HS-5, rated at surface area of 325 $m^2$/gm. and particle diameter of 70 Å.; purity 99.8% $SiO_2$), bulk density of 0.037 (max.). Add the saturated CuCl - acetonitrile solution, in fresh form, prepared above. Also add 45 volume parts of additional pure acetonitrile to obtain more fluid consistency, and allow to stand overnight. Affix the flask to a rotary evaporation unit, adding a number of ½-inch ceramic balls to enhance mixing. Increase temperature gradually to about 60° C. under vacuum to remove most of the solvent. The resulting solids are dried in a vacuum oven at 90°–100° C. overnight.

Preparation of Solution of KCl and LaCl$_3$ in Formic Acid

Prepare a solution of 2.75 parts of KCl and colloidally disperse 2.25 parts of anhydrous LaCl$_3$ in about 70 volume parts of 97–98% pure formic acid. (If the LaCl$_3$ is in hydrate form, it normally will be dried). Protect the LaCl$_3$ and the solution from moisture.

Impregnation of Silica-CuCl with KCl and LaCl$_3$

To a flask containing the SiO$_2$-CuCl solids, add the above formic acid solution containing KCl and LaCl$_3$. Mix and allow to equilibrate overnight protected from the atmosphere. Place in a rotary evaporator. Use low RPM and bring the temperature up to about 60° C. at full aspirator vacuum. The material will go from a slurry stage to a tacky stage and next to a granular stage. At this point maintain the vacuum but reduce the RPM to zero. This is to maintain a granular form rather than going to a fine dusty material. After about 2 hours total, transfer the flask and its contents to a vacuum oven overnight at about 90°–100° C.

Remove the contents and size or crush and collect that portion between −40 + 100 mesh. The fines passing through 100 mesh, comprising about ⅓ the total solids, may be reconstituted to a coarser mesh by reintroducing solvent such as formic acid or methanol and again going through the evaporation step at low RPM, and drying and crushing to size as above.

Such finished catalyst was examined by the usual nitrogen sorption methods for surface area and pore structure. The following results were obtained.

| | |
|---|---|
| Surface area (sq.m./gm.) | = 92.9 |
| Pore volume (cc./gm.), total | = 0.34 |
| Volume of pores having radius ≧ 200 Angstroms | = 0.17 |
| Volume of pores having radius ≧ 50 Angstroms | = 0.26 |

Based on the carrier surface area as 325 m.$^2$/gm. and assuming the coverage of the catalyst surface is approximately 1,000 square meters per gram of KCl and LaCl$_3$, it can be calculated by the formula below that a layer of KCl/LaCl$_3$ of average thickness about 1.7 molecules would theoretically be formed on the silica carrier by the 2.75 parts of KCl and 2.25 parts of LaCl$_3$:

$$\text{Thickness} = \frac{\text{(Parts composing KCl/LaCl}_3\text{ layer)} \times 1000}{\text{(Parts representing support)} \times 325}$$

By the same formula, the thickness of the underlying cuprous chloride layer calculates to 3.4 molecules.

COMPARISON

A silica gel/copper chloride catalyst was prepared in conventional manner using a silica gel carrier of comparable surface area to that of the pyrogenic silica particles serving as carrier for the above-described catalyst of Example I (i.e. gel of area 300 sq.m./gm.), and having relatively large average pore diameter of 120 Angstroms. The support was heated, and then impregnated with aqueous cupric chloride and with aqueous potassium and lanthanum chlorides, in conventional manner; and was screened to −40 to 200 mesh. Its surface area and pore structure were determined in the same manner as for the catalyst of Example I, with the following results:

| | |
|---|---|
| Surface area (sq.m./gm.) | = 224 |
| Pore volume (cc./gm.), total | = 0.89 |
| Volume of pores having radius ≧ 200 Angstroms | = 0.01 |
| Volume of pores having radius ≧ 50 Angstroms | = 0.64 |

It will be seen that the pore structure of the catalyst of Example I — considering the voids within the catalyst granules, between the particles of supported catalyst, as being "pores" — is radically different from the pore structure of conventional silica gel/copper chloride catalysts.

Catalyst Evaluations

Catalysts prepared as in Example I above and Example II below were used in oxyhydrochlorination runs with methane, and that of Example III below was used in production of chlorine from HCl and oxygen. The results are summarized in Tables I, II and III, below.

The reactor used consisted essentially of a vertical open ended quartz tube, surrounded by an outer tube or jacket, and supported in an electrically heated furnace. Reactant gases are supplied at the desired temperature through inlet valves and pass out through exit valves controlled by a temperature controller. The jacket is sealed to the inner reactor tube near the top of that tube and closes over below the open bottom end of the reactor tube. The catalyst bed is retained in the reactor by a quartz wool plug at the bottom, then crushed quartz (medium and fine) and on top a quartz wool plug covered by crushed quartz.

The reactant gases enter the jacket through a side arm, flow down the annulus between the jacket and the inner reactor tube to the closed off bottom of the jacket, rise from there into the open end of the reactor tube, pass through the catalyst bed therein, and exit from the top of the reactor tube.

The exit manifold delivers reactants to product separating chromatographic columns and associated detectors, and then to an outlet. The flows of the three principal reactant gases, HCl, O$_2$, CH$_4$ and diluent gas N$_2$ are set and regulated by electronic flow controllers. Total pressure of the combined reactant mixture is recorded by a pressure recorder ahead of the inlet.

Carrier gas helium is controlled by a pressure regulator and diverted to the chromatographic columns by another valve.

The catalyst of Example I was activated for the runs of Table I by starting the operations with volume ratio of O$_2$:CH$_4$:HCl typically 2:1:4 and at a temperature of 350° C.

The headings of the tables below are explained as follows, where [ ] represents mols per 100 mols of the inlet reactants (i.e., CH$_4$, O$_2$ and HCl) and [CM] represents total mols of chlorinated methanes per 100 mols of reactants.

"R.T." (residence time) = (catalyst void space)/(inlet gas flow rate at reaction temperature), where catalyst void space is taken as 50% of the volume of the catalyst bed.

"Conv. $CH_4$" (conversion) = 100 {[$CH_4$]in − [$CH_4$]out}/[$CH_4$]in.

"Select. $CH_4$" (selectivity) = 100 [CM]/{[$CH_4$]in − [$CH_4$]out}.

Depth of chlorination = 25{[$CH_3Cl$] + 2[$CH_2Cl_2$] + 3[$CHCl_3$] + 4[$CCl_4$]}/[CM].

"Deacon" = 100 × {[HCl]in + [HCl]formed − [HCl]out}/{[HCl]in + [HCl]formed}, where [HCl]formed is that theoretically formed by reaction of $Cl_2$ with a methane hydrogen atom (forming = CCl + HCl); i.e., [HCl]formed = [$CH_3Cl$] + 2[$CH_2Cl_2$] + 3[$CHCl_3$] + 4[$CCl_4$].

"% free $Cl_2$" = volume of chlorine product per 100 volumes of inlet reactants.

100° C. at gradually reduced pressure to remove excess formic acid. The solid residue was broken up and put through a 40-mesh screen. Results of using this catalyst at a series of decreasing temperatures, from 370° C. down to 324° C., are shown in Table II. It will be noted that the activity remained high at 324° C., comparable to that at 370° C.

Table II:

| Use of Catalyst of Example II for OHC of Methane | | | | | | | |
|---|---|---|---|---|---|---|---|
| Inlet Composition (volume percent) | | | Conditions | | Results | | |
| $O_2$ | $CH_4$ | HCl | Temp. ° C. | R.T. Sec. | Conv. $CH_4$ | Select. $CH_4$ | Depth of Chlor. | Deacon |
| 28.12 | 16.12 | 56.35 | 370. | 2.58 | 96.9 | 70.6 | 89.0 | 84.58 |

Table I:

| | Use of Catalyst of Example I for OHC of Methane | | | | | | | | |
|---|---|---|---|---|---|---|---|---|---|
| | Inlet Composition (volume percent) | | | Conditions | | Results | | | |
| Run No. | $O_2$ | $CH_4$ | HCl | Temp ° C. | R.T. Sec. | Conv. $CH_4$ | Select $CH_4$ | Depth Chlorin. | Deacon | %Free $Cl_2$ |
| 1 | 17.9 | 18.7 | 63.4 | 318 | 2.59 | 63.9 | 90.1 | 59.4 | 66.1 | |
| 2 | 21.7 | 11.3 | 67.0 | 173 | 2.09 | 71.3 | 73.1 | 78.0 | 51.7 | |
| 3 | 23.2 | 15.8 | 60.9 | 220 | 2.88 | 63.1 | 92.6 | 70.9 | 74.7 | |
| 4 | 24.2 | 12.7 | 63.2 | 203 | 1.95 | 83.4 | 82.6 | 81.9 | 72.4 | |
| 5 | 24.6 | 12.7 | 63.3 | 260 | 1.75 | 92.0 | 76.4 | 81.7 | 76.5 | |
| 6 | 25.6 | 12.6 | 61.8 | 223 | 2.26 | 80.3 | 65.9 | 77.3 | 61.0 | |
| 7 | 26.2 | 13.1 | 60.7 | 260 | 210 | 86.5 | 71.2 | 78.0 | 73.2 | 6.17 (=20% of theory based on inlet HCl) |
| 8 | 26.3 | 14.4 | 59.3 | 279 | 2.40 | 82.1 | 70.7 | 74.1 | 75.7 | |
| 9 | 26.5 | 18.3 | 55.2 | 257 | 2.68 | 72.6 | 87.5 | 72.0 | 90.7 | |
| 10 | 28.3 | 15.4 | 56.3 | 318 | 2.25 | 90.2 | 65.7 | 77.5 | 83.8 | |
| 11 | 31.3 | 16.0 | 52.6 | 228 | 2.92 | 77.9 | 60.4 | 74.5 | 63.3 | |
| 12 | 34.3 | 17.3 | 48.3 | 243 | 2.84 | 80.4 | 57.2 | 74.5 | 70.0 | |
| 13 | 35.9 | 13.4 | 50.7 | 292 | 2.14 | 94.4 | 57.8 | 86.2 | 66.8 | |
| 14 | 36.9 | 19.2 | 43.9 | 245 | 3.57 | 54.0 | 100.0 | 85.0 | 100.0 | |
| 15 | 37.3 | 14.0 | 48.6 | 235 | 2.37 | 84.6 | 64.6 | 80.9 | 68.3 | |
| 16 | 37.3 | 19.1 | 43.6 | 250 | 3.54 | 91.6 | 59.9 | 68.9 | 100.0 | 7.38 (=34% of theory based on inlet HCl) |
| 17 | 40.1 | 11.8 | 48.2 | 312 | 1.79 | 100.0 | 59.0 | 90.1 | 70.5 | |
| 18 | 41.6 | 12.8 | 45.6 | 223 | 2.11 | 84.4 | 67.1 | 82.4 | 69.4 | |

EXAMPLE II. CATALYST PREPARATION FROM $CuCl_2$

A pyrogenic silica carrier (Cabot Corp. CAB-O-SIL Grade M-5, rated at surface area of 200 sq. m./gm. and particle diameter 120 Å; purity 99.8% $SiO_2$) was impregnated in two steps, first with anhydrous $CuCl_2$ dissolved in methanol, second with KCl and anhydrous $LaCl_3$ in formic acid medium as follows: 1.288 gm. $CuCl_2$ was dissolved in 55 ml. of methanol; this solution was combined with 2.0 gm. pyrogenic silica and allowed to stand overnight. The mixture was gently heated under reduced pressure to remove the methanol solvent, leaving the silica impregnated with $CuCl_2$. Separately, 0.392 gm. of KCl was dissolved in 35 ml. of 97–98% pure formic acid and combined with 0.320 gm. $LaCl_3$ (prepared by drying $LaCl_3$ hydrate at 125° C.–150° C. under reduced pressure) to form a sol or sol-like liquid. Next the solid mixture of silica-$CuCl_2$ was combined with the liquid mixture of KCl-$LaCl_3$-formic acid; and the resulting slurry was allowed to stand overnight after which the mixture was dried at

| 365. | 2.60 | 96.2 | 71.4 | 88.2 | 83.02 |
| 357. | 2.63 | 95.5 | 75.1 | 85.4 | 83.87 |
| 350. | 2.66 | 93.5 | 80.3 | 85.1 | 81.23 |
| 341. | 2.70 | 92.0 | 82.9 | 84.6 | 81.28 |
| 332. | 2.74 | 90.5 | 80.7 | 82.0 | 82.14 |
| 324. | 2.78 | 90.2 | 84.8 | 83.7 | 85.84 |

EXAMPLE III. CATALYST PREPARATION USING TITANIA CARRIER

Essentially the procedure of Example I was employed to prepare a catalyst composed of pyrogenic anhydrous titania carrier amounting to about 80% by weight, having surface area of about 50 square meters per gram, and a cuprous chloride layer (13.6% by weight) followed by a potassium chloride (3.8%)/lanthanum chloride(3.1%) layer.

This catalyst promoted formation of chlorine by reaction of HCl and oxygen as indicated in Table III below:

Table III:

| Use of Catalyst of Example III for Deacon Reaction | | | | | | | | | | |
|---|---|---|---|---|---|---|---|---|---|---|
| Inlet Composition (vol. percent) | | | Conditions | | Exit Composition (volume percent) | | | | | |
| $O_2$ | HCl | $N_2$ | Temp. ° C. | R.T. Sec. | $O_2$ | HCl | $N_2$ | $Cl_2$ | $H_2O$ | Deacon |
| 19.1 | 76.2 | 4.8 | 382 | 1.93 | 15.1 | 60.2 | 4.8 | 8.0 | 8.0 | 21.0 |
| 22.2 | 73.0 | 4.8 | 372 | 1.96 | 17.1 | 52.5 | 4.8 | 10.3 | 10.3 | 28.1 |
| 19.1 | 76.2 | 4.8 | 362 | 1.99 | 18.8 | 75.1 | 4.8 | 0.5 | 0.5 | 1.4 |
| 19.1 | 76.4 | 4.6 | 352 | 2.02 | 19.1 | 76.4 | 4.6 | 0.0 | 0.0 | 0.0 |

EXAMPLE IV. CATALYST PREPARATION USING ALPHA-ALUMINA CARRIER

Essentially the procedure of Example I was employed to prepare a catalyst of alpha-alumina carrier (66%), CuCl (22.7%), KCl (11.3%). The carrier was obtained by heating pyrogenic gamma-alumina particles (surface area found = 91 sq.m./gm.) at 900° C. for 24 hours. Surface area found for the resulting alpha-alumina carrier = 90 sq.m./gm. The pyrogenic gamma-alumina itself is operative as a carrier in our catalysts, but is less stable toward the HCl reactant than is alpha-alumina.

This catalyst employing alpha-alumina as carrier is effective for oxyhydrochlorination of methane at temperatures well below 300° C.; and when excess HCl is employed, over the stoichiometric ratio of 4:1 for conversion of the methane to $CCl_4$, a considerable proportion of free chlorine is obtained, as shown in Table IV below.

Examples of OHC of ethylene are given in Table V below, using a catalyst prpared as in Example I above and generally similar conditions to those of Table I.

Table V.

| | | Use of Catalyst of the Invention for OHC of Ethylene | | | | | | | | |
|---|---|---|---|---|---|---|---|---|---|---|
| | | Inlet Compsn. (vol. percent) | | | | Exit Composition (vol. normalized to inlet $N_2$) | | | | |
| Run No. | Temp. °C. | $O_2$ | $C_2H_4$ | HCl | $N_2$ | $O_2$ | $C_2H_4Cl_2$ | $N_2$ | $CO_2$ | $Cl_2$* | Deacon |
| Series A | | | | | | | | | | | |
| 1. | 250 | 13.7 | 24.4 | 53.3 | 8.6 | 0.07 | 24.0 | 8.6 | 0.2 | — | 100 |
| 2. | 223 | 13.7 | 24.1 | 53.6 | 8.6 | 0.11 | 23.5 | 8.6 | — | — | 100 |
| 3. | 188 | 13.4 | 24.1 | 54.0 | 8.5 | 0.72 | 23.2 | 8.5 | — | — | 94 |
| 4. | 165 | 13.1 | 24.2 | 54.2 | 8.5 | 1.3 | 22.6 | 8.5 | — | — | 87 |
| 5. | 145 | 13.5 | 24.1 | 53.6 | 8.8 | 1.9 | 21.4 | 8.8 | — | — | 87 |
| 6. | 125$^{(E)}$ | 13.9 | 25.9 | 49.4 | 10.8 | 3.8 | 20.9 | 10.8 | — | — | 82 |
| Series B | | | | | | | | | | | |
| 1. | 330 | 15.3 | 7.87 | 68.5 | 8.34 | 0.2 | 7.57 | 8.34 | 0.31 | 14.46 | 86 |
| 2. | 310 | 15.1 | 7.65 | 69.0 | 8.27 | 1.3 | 7.67 | 8.27 | 0.24 | 11.74 | 79 |
| 3. | 290 | 15.1 | 7.67 | 68.9 | 8.28 | 3.7 | 7.67 | 8.28 | 0.0 | 7.46 | 66 |
| 4. | 270$^{(E)}$ | 15.1 | 7.67 | 69.0 | 8.20 | 6.5 | 7.65 | 8.20 | 0.0 | 2.10 | 50 |
| Series C | | | | | | | | | | | |
| 1. | 260 | 14.3 | 14.66 | 63.1 | 7.98 | 0.4 | 14.5 | 7.98 | 0.1 | — | 87 |
| 2. | 211 | 14.4 | 14.61 | 62.9 | 8.03 | 1.1 | 14.0 | 8.03 | 0.0 | — | 85 |
| 3. | 176 | 14.5 | 14.77 | 62.7 | 8.00 | 2.6 | 12.8 | 8.00 | 0.0 | — | 76 |
| 4. | 140$^{(E)}$ | 14.3 | 14.59 | 63.2 | 7.94 | 4.7 | 10.3 | 7.94 | 0.0 | — | 61 |

Notes
$^{(E)}$Temperature so marked is "extinction" temperature, i.e. lower limit for catalyst activity using the specified proportions of the inlet materials.
*Some free chlorine was generally formed in the experiments of this Table V, but was determined quantitatively only in the runs of Series B.

Table IV.

| Use of Catalyst of Example IV for Combined Oxyhydrochlorination and Chlorine Production | | | | | | | | |
|---|---|---|---|---|---|---|---|---|
| Inlet Composition (volume percent) | | | Conditions | | Results | | | |
| $O_2$ | $CH_4$ | HCl | Temp. °C. | R.T. Sec. | Conv. $CH_4$ | Select. $CH_4$ | Deacon | Free $Cl_2$ (Vol. %) |
| 28.66 | 10.57 | 60.77 | 270 | 2.62 | 88.47 | 44.73 | 85.41 | 18.44 |

The present catalyst, especially with silica as the anhydrous pyrogenic support, is useful in general in oxyhydrochlorination of organic materials by vapor phase reaction between oxygen and hydrogen chloride; e.g. chlorination of an organic compound such as benzene and other aromatics, butanes, propane, ethane and ethylene as well as methane and partial chlorination products from the foregoing.

In oxyhydrochlorination of ethylene to ethylene dichloride, use of temperatures below 300° C., such as 225°–275° C. is known (U.S. Pat. No. 3,210,431 of Oct. 5, 1965 to W. F. Engel). The present cuprous chloride on pyrogenic silica catalyst not only operates in such reactions as low as 125° C. but also shows very high selectivity for chlorination vs. oxidation. Another special feature of OHC of ethylene with our said catalyst is that at temperatures such as 250°–275° C. both ethylene dichloride and vinyl chloride can be produced in the reaction.

When ethane is oxyhydrochlorinated using a catalyst prepared as in Example I, temperatures as low as the range of 125°–150° C. can be used. A level of conversion to chlorinated products of about 75–85% can be obtained in this temperature range using short residence times such as 1.5 to 3 seconds. The Deacon value under these conditions is about 80–85%. The selectivity for chlorination of ethane vs. oxidation is very high below 150° C., as indicated by absence of detectable $CO_2$ in the products obtained under the above-mentioned conditions for OHC of ethane.

We claim:
1. An improved copper chloride/alkali metal chloride catalyst on silica, titania or alpha-alumina carrier, effective for production of chlorine or chlorination of organic material by vapor phase reaction between hydrogen chloride and elemental oxygen, which catalyst is essentially anhydrous and consists essentially of granules composed of a relatively low bulk density carrier of open structure and active catalyst; the carrier being between about 30% and about 85% by weight of the total catalyst and being silica, titania or alpha-alumina particles, which particles are non-porous and have diameters in the range of about 50 to 1000 Å, and said carrier having surface area of at least about 50 square meters per gram measured by the BET method using nitrogen gas; the catalyst granules having voids within the granules such that at least 20% of the voids have radius greater than 200 Å as measured by nitrogen sorption isotherms; and the surface of said granules being occupied by active catalyst composed of a first layer of copper chloride, essentially in the cuprous form, being at least about 10% by weight of the total catalyst and of a second layer of at least one alkali metal chloride, permissibly also containing at least one rare earth metal chloride, said copper chloride being the largest molecular proportion of said active ingredients and the amount of active ingredients being at least sufficient theoretically to cover the carrier particles with a coating one molecule thick.

2. Catalyst of claim 1 consisting essentially of non-porous particles of pyrogenic silica of surface area, by the BET method, of 100 to 400 square meters per gram as carrier; the active ingredients being alkali metal chloride and rare earth metal chloride deposited over a layer of copper chloride, in an amount sufficient theoretically to form a layer of active ingredients covering the carrier particles to an average thickness between one and about ten molecules.

3. Catalyst of claim 2 wherein a rare earth metal chloride is a minor molecular proportion of the alkali metal/rare earth metal chloride constituent.

4. Catalyst of claim 3 wherein the alkali metal chloride is potassium chloride, the content of the rare earth metal chloride constituent is at least about 5% by weight of the total catalyst, the potassium chloride constituent is at least equal in weight to the rare earth metal chloride constituent, and the copper chloride constituent forms essentially the balance of the catalyst and is at least about 10% by weight of the total catalyst.

5. Catalyst of claim 4 wherein the rare earth metal chloride comprises lanthanum chloride.

6. Process of preparing an improved copper chloride/alkali metal chloride catalyst on silica, titania or alpha-alumina carrier in accordance with claim 1, which comprises impregnating pyrogenic silica or titania, or alpha-alumina particles obtained by heating pyrogenic gamma-alumina, using essentially anhydrous solvents, first with a solution of cuprous chloride in a volatile organic solvent, and drying; then with a solution or colloidal dispersion consisting essentially of potassium chloride and lanthanum chloride in a volatile organic solvent, and drying; and activating the catalyst by heating with hydrogen chloride or hydrogen or with the reactants for oxyhydrochlorination of an organic compound, whereby the catalyst is active at temperatures of 300° C. for oxyhydrochlorination of methane; the proportions of carrier and active ingredients being chosen to give, by weight in the total catalyst, 30% to 85% carrier, and to make the cuprous chloride at least about 10% by weight of the total catalyst.

7. Process of claim 6 wherein pyrogenic silica is used as the catalyst carrier; the solvent used for cuprous chloride is acetonitrile and the solvent used for potassium chloride/lanthanum chloride is formic acid; and the proportions of carrier and active ingredients are chosen to give, by weight in the total catalyst, 30% to 85% silica, at least about 5% lanthanum chloride and potassium chloride at least about equal in weight to the lanthanum chloride.

* * * * *